United States Patent Office 3,482,670
Patented Dec. 9, 1969

3,482,670
AUTOMATIC VENDING MACHINE CONTROL SYSTEM
Katsunori Yamashita, c/o Tateisi Electronics Co., 20 Igadera, Shimokaiinji, Nagaoka-cho, Otokuni-gun, Kyoto, Japan
Filed Apr. 15, 1968, Ser. No. 721,344
Claims priority, application Japan, Apr. 20, 1967, 42/25,302
Int. Cl. G07f 5/24, 9/04
U.S. Cl. 194—10        3 Claims

ABSTRACT OF THE DISCLOSURE

An automatic vending machine control system which enables the machine to automatically return change to purchasers when the article purchased has been overpaid, to return the money introduced when the article has been underpaid or when the purchasers wish to refrain from purchasing. The system employs reversible counters which are automatically and alternatively set for summation or subtraction. When money has been introduced into the machine, the "money" pulses corresponding to the value of the money introduced are applied to the counters set for summation so that the value is registered in the counters. Then, when an article has been selected, the "price" pulses corresponding to the price of the article selected are applied to the counters which are then set for subtraction so that the price of the article selected is subtracted from the value of the money introduced. If the result of the subtraction is positive, subtraction pulses are applied to the counters until the subtraction results in zero, and at the same time, money corresponding to the subtraction pulses that have been applied is returned as change to the purchaser. When the money introduced does not amount to the price of the article selected, over-subtraction will result, whereupon the counters are set for summation and the "price" pulses are applied to the counters to bring the output condition of the counters back to that when the money was previously introduced. Then, the counters are again set for subtraction, and subtraction pulses are applied to the counters until the result of the subtraction becomes zero, and at the same time money corresponding to the subtraction pulses that have been applied is returned to the purchaser without delivering out any article at all. When, after introducing money into the machine, the purchaser wishes to refrain from purchasing, the counters that have until then been conditioned for summation are set for subtraction, so that subtraction pulses are applied thereto until the result of the subtraction becomes zero. At the same time money corresponding to the subtraction pulses that have been applied is returned to the purchaser without delivering out any article.

---

This invention relates to an automatic vending machine control system which enables the machine to automatically return money to customers whenever it is necessary to do so.

In automatic vending systems there often are cases in which money must be returned to customers. For example, if the value of the money introduced into the machine exceeds the price of the article purchased, the change must be returned to the purchaser; if the money introduced does not amount to the price of the article selected, or if the purchaser wishes to refrain from buying after he has introduced some money into the machine, the money that has been introduced must be returned to the owner.

In most prior art automatic vending systems, a predetermined number of coins are stored in the machine so as to be returned to the customer whenever necessary. However, the arrangement is generally such that once money has been introduced into the machine, it cannot be paid back even when the purchaser wishes to refrain from purchasing. In such a case, therefore, the person in charge of the machine must be summoned to return the money to the purchaser. This, however, not only reduces the working efficiency of the vending machine, but also causes much inconvenience to the users of the machine.

Accordingly, the primary object of the invention is to provide an automatic vending machine control system which enables the machine to automatically return money to customers whenever it is necessary to return any money to them.

Another object of the invention is to provide an automatic vending machine which is designed to store the money introduced thereinto and yet which is capable of returning money to customers whenever it is necessary to do so.

Another object of the invention is to provide an automatic vending machine which is provided with means for storing coins to be returned as change to purchasers, and which can automatically return to them as many of the stored coins as are required to be returned otherwise than as change.

Still another object of the invention is to provide an automatic vending machine which includes reversible pulse counters which are able to be automatically and alternately set ready for summation or subtraction. When money is introduced into the machine, its value is converted into corresponding "money" pulses, which are counted, summed up and registered in the counters. When an article has been selected by a purchaser, the "price" pulses corresponding to the price of the article are applied to the counters so that the price of the article selected is subtracted from the value of the money introduced. If the result of the subtraction is positive, money corresponding to the difference between the price and the value of the money is returned as change to the purchaser. If the result of the subtraction is negative, that is, when the money introduced does not amount to the price of the article selected, the money introduced is returned to the owner.

Still another object of the invention is to provide an automatic vending machine control system which enables the machine to return to the purchaser all the money already introduced into the machine any time he wishes to refrain from purchasing.

Other objects of the invention will become apparent from the following detailed description of one preferred embodiment thereof with reference to the accompanying drawing, wherein.

Figure 1:
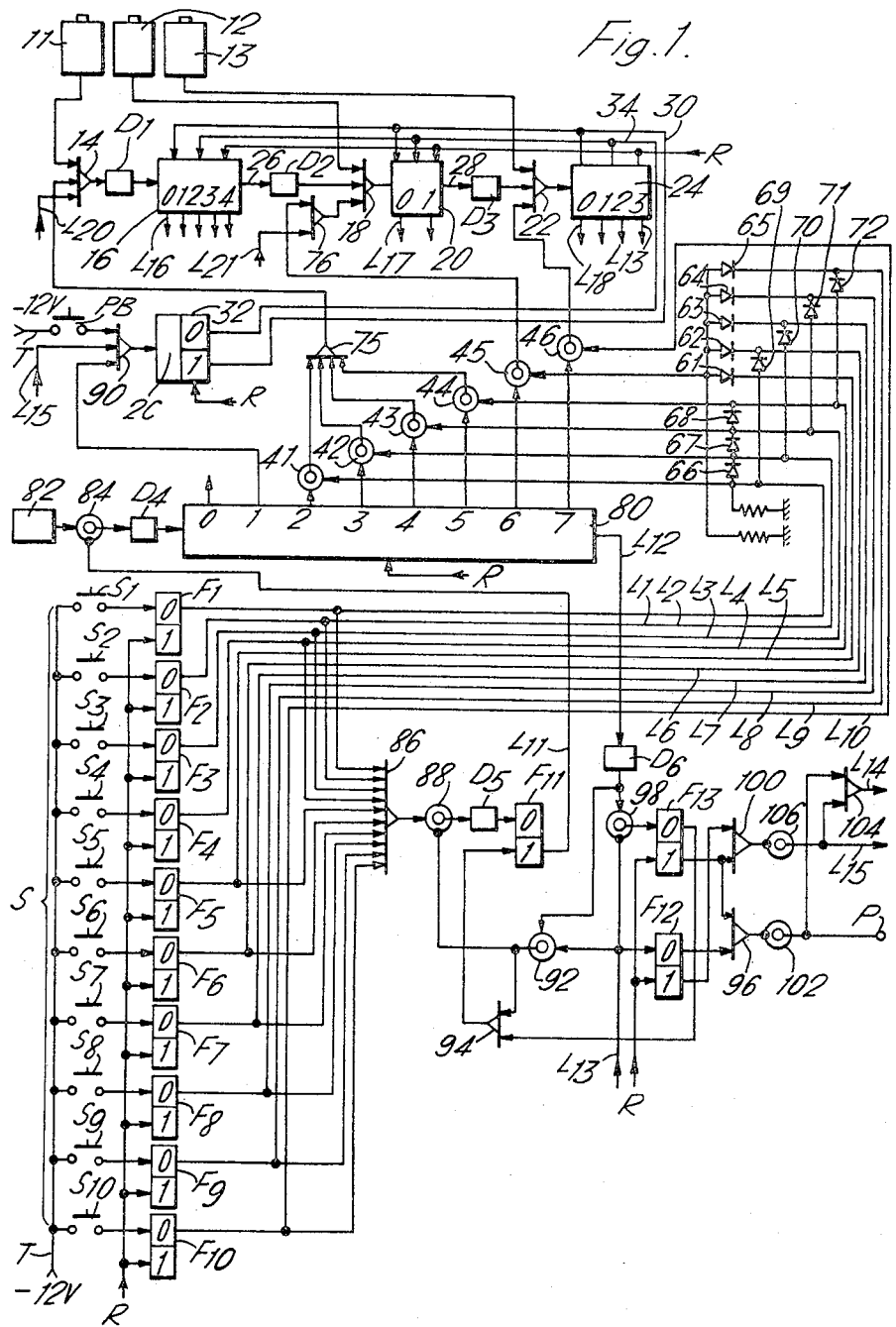
FIG. 1 is a schematic block diagram of the system of the invention.

The illustrated embodiment of the invention is so constructed and designed that ten different kinds of articles priced at 10, 20, 30, 40, 50, 60, 70, 80, 90 cents and one dollar are on sale, and that 10-cent, 50-cent and one dollar coins are acceptable. Of course, the number of articles to be sold and the types of coins to be used are variable, and the circuit arrangement may accordingly be changed.

The coin that has been introduced into the machine is first tested by three testers 11, 12 and 13 in accordance with its denomination. The three testers are adapted to recognize 10-cent, 50-cent and one dollar coins, respectively, and produce one output pulse upon recognition of every one corresponding kind of coin.

The output pulses from the tester 11 are applied through an OR element 14 and a differentiator D1 to a quinary reversible pulse counter 16; the output pulses from the tester 12 are applied through an OR element 18 to a binary reversible pulse counter 20; and the output pulses from the tester 13 are applied through an OR element 22 to a quaternary reversible pulse counter 24. The counting capacity of the counter 24 is varible according to the highest price of the articles to be sold. The "carry" output pulse from the counter 16 is applied through a line 26 to a differentiator D2, the output from which is applied as a second input to the OR element 18; and the "carry" pulse from the counter 20 is applied through a line 28 to a differentiator D3, the output from which is applied as a second input to the OR element 22.

Prior to the introduction of coins into the machine, all the counters 16, 20 and 24 are reset by the signal from the terminal R so that they produce an output on their respective "0" output lines. At this time, a summation command signal is applied to the counters from a line 30 as will be described later, so that they are set ready for summation. The summation command signal is the reset output from a binary counter 32. As will be described later, when the counter 32 has been set, it produces on a line 34 a set output signal to be applied as a subtraction command signal to the counters 16, 20 and 24.

As many article selection push button switches as there are different kinds of articles on sale are provided. In the illustrated embodiment there are ten of them designated by S1 to S10, corresponding to 10-cent to one dollar articles, respectively. The switches have their one sides connected to a source terminal, such as a —12 volt potential and the other sides connected to the set input terminals of flip-flops F1 to F10, respectively. The set outputs from the flip-flops F1 to F10 are connected to lines L1 to L10, respectively. The lines L1, L2, L3 and L4 are connected to one input of AND elements 41, 42, 43 and 44, respectively; the lines L5 to L9 are connected through diodes 61 to 65, respectively, to one input of a single AND element 45; and the line L10 is connected to one input of an AND element 46. Between each adjacent two of the lines L1 to L4 there are connected diodes 66 to 68, respectively; and diodes 69, 70, 71 and 72 are connected between the lines L1 and L6,L2 and L7, L3 and L8, L4 and L9, respectively. If the set output from each of the flip-flops F1 to F10 is a negative voltage, e.g., —12 volt, this negative voltage is applied as one input to the AND elements 41 to 46 directly or indirectly through the diodes 66 to 72.

To put it in more detail, when the flip-flop F1 has been set, the AND element 41 only receives one input. However, when the flip-flop F2 is set, not only the AND element 42 but also the AND element 41 receives an input because the potential at the cathode side of the diode 66 becomes negative so that the diode becomes conductive. In similar manners, when the flip-flop F3 is set, the AND elements 43, 42 and 41 receives one input; when the flip-flop F4 is set, the AND elements 44, 43, 42 and 41 receive one input. However, when the flip-flop F5 is set, the AND element 45 only receives an input. When the flip-flop F6 is set, the AND element 45 receives an input and due to the diode 69, the AND element 41 also receives an input. Similarly, when the flip-flop F7 is set, the AND element 45 receives an input and at the same time due to the diodes 70 and 66 the AND elements 42 and 41 receive an input; when the flip-flop F8 is set, the AND elements 45, 43, 42 and 41 receive an input; and when the flip-flop F9 is set, the AND elements 45, 44, 43, 42 and 41 receive an input; and when the flip-flop F10 is set, the AND element 46 receives an input.

It will be seen from the above description that when any one of the 10-cent to 40-cent article selection push-buttons is pressed, as many of the AND elements 41 to 44 as are equal to the number of the price of the selected article divided by 10-cents receives an input, and that when the 50-cent and 1-dollar article selection push-button switches have been closed, the AND elements 45 and 46, respectively, receive an input; and when only one of the 60-cent to 90-cent article selection push button switches has been closed, the AND element 45 receives an input, and at the same time as many of the AND elements 41 to 44 as are equal to the number of the price of the selected article minus 50 cents and divided by 10 cents receives an input. The outputs appearing successively at the "2" to "7" output lines from an octal counter 80 are applied as the other input to the AND elements 41 to 46, respectively, as will be described later in detail.

The outputs from the AND elements 41 to 44 are applied through an OR element 75 to the OR element 14; the output from the AND element 45 is applied through an OR element 76 to the OR element 18; and the output from the AND element 46 is applied to the OR element 22.

When the outputs of the "2" to "7" output lines of the counter 80 are successively applied to the AND elements 41 to 46, they may be said to be scanning the AND elements. Therefore, the counter 80 may be called the "scanning counter."

A pulse generator 82 applies to the input of the counter 80 a series of clock pulses through an INHIBIT element 84 and a differentiator D4. When the system begins to operate, the reset output signal from a flip-flop F11 is applied through a line L11 as an inhibit input to the inhibit element 84, so that no input pulses can enter the scanning counter 80. However, upon closing of any one of the switches S1 to S10, a signal is applied through an OR element 86 and an INHIBIT element 88 to a differentiator D5, the output from which sets the flip-flop F11 thereby removing the inhibit input applied to the INHIBIT element 84. Then, the counter 80 begins to count the clock input pulses from the generator 82.

When the counter 80 has counted a first input pulse, an output appears on the "1" output line of the counter. This signal is applied through an OR element 90 to the binary counter 34 to reverse its output condition, so that the signal on the line 30 disappears and instead a signal appears on the line 34. This signal on the line 34 is applied as the subtraction command signal to the counters 16, 20 and 24, as previously mentioned. Under the condition, as the output signals from the AND elements 41 to 46 corresponding to the price of the article selected are applied to the counters so as to be subtracted from the number of pulses memorized therein corresponding to the value of the money introduced, as will be described later in detail.

The INHIBIT element 88 receives as its inhibit input the output from an AND element 92, one input to which is the "carry" output pulse from the scanning counter 80 through a line L12 and a differentiator D6. The other input to the AND element 92 is the output on the greatest numbered (in the illustrated embodiment, "3") output line L13 of the counter 24. Immediately after the switches S1 . . . , or S10 has been closed, no signal exists on the line L12, so that the AND element 92 produces no output to be applied as an inhibit input to the INHIBIT element 88.

If the price of the article selected exceeds the value of the money that has been introduced into the machine, over-subtraction is resulted in the counters 16, 20 and 24, so that the counter 24 produces an output on the line L13 as will be described later, which is applied as one input to the AND element 92. Under the condition, when the counter 80 produces on the line L12 a carry output pulse to be applied as the other input to the AND element 92, the element 92 produces an output, which is applied as an inhibit input to the INHIBIT element 88 and at the same time as a reset input to the flip-flop F11 through an OR element 94. The signal on the line L13 is also applied as a set input to a flip-flop F12, the set output from which is applied to an OR element 96.

When the value of the money introduced exceeds the price of the article selected, the counter 24 produces no output on the "3" output line. Since there is no signal on the line L13, no inhibit input is applied to the INHIBIT element 98. Consequently, every time the counter 80 produces one "carry" pulse on the line L12, this pulse is applied through the INHIBIT element 98 to set a flip-flop F13. The set output from the flip-flop F13 is applied to the OR element 94, and the reset output from the flip-flop F13 disappears that has until then been applied as an input to an OR element 100 and also the OR element 96. As a result, the OR element 96 receives no input so that a NOT element 102 produces an output at a terminal P. The appearance of this signal at the terminal P indicates the termination of the subtraction performed in the counters 16, 20 and 24. The signal at the terminal P can be used to operate a mecahnism for delivering out an article that has been selected by the purchaser.

The output from the NOT element 102 is also applied through an OR element 104 to a line L14. The signal on the line L14 is used to return change to the purchaser.

As previously mentioned, when the price of the article selected exceeds the value of the money introduced, the flip-flop F12 is set. However, prior to the setting of the flip-flop F12, the "carry" output pulse from the counter 80 must have set the flip-flop F13 through the line L12, thereby removing its reset output therefrom. After then, therefore, when the flip-flop F12 is set, the two inputs to the OR element 100 are removed, so that a NOT element 106 produces an output on a line L15. The output from the NOT element 106 is also applied to the OR element 104, the output from which can be used as a signal to return the money that has been introduced to the machine to the purchaser. The signal on the line L15 is applied as one input to the OR element 90.

Figure 2:
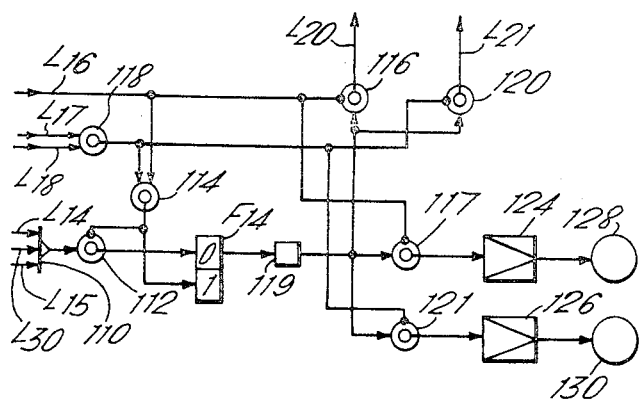
FIG. 2 is a schematic block diagram of a money-delivery control circuit included in the system of the invention.

The circuit arrangement for returning money to the customer is shown in FIG. 2. The signals on the line L14 and L15 are applied through an OR element 110 as an input to an INHIBIT element 112, the output from which sets a flip-flop F14. The signal on the "0" output terminal of the counter 16 is applied through a line L16 as one input to an AND element 114 and as an inhibit input to INHIBIT elements 116 and 117. The signals appearing on the "0" output terminals of the counters 20 and 24 are applied to an AND element 118 through lines L17 and L18, respectively. The output from the AND element 118 is applied as another input to the AND element 114 on the one hand and as an inhibit input to INHIBIT elements 120 and 121. The lines L20 and L21 on which the outputs from the INHIBIT elements 116 and 120 appear, respectively, are connected to one input terminal of the OR elements 14 and 76, respectively.

The set output from the flip-flop F14 actuates a clock pulse generator 119, which produces output pulses to be applied as an input to the INHIBIT elements 116, 120, 117 and 121. The outputs from the INHIBIT elements 117 and 121 are applied to amplifiers 124 and 126, respectively. The amplified outputs energize solenoids 128 and 130, respectively, for delivering out as many 10-cent and 50-cent coins, respectively, as are required to be returned to the purchaser.

When it is required to return money to a customer, a signal appears on either or both of the lines L14 and L15, as previously mentioned, so that the OR element 110 produces an output. At this time, if the AND element 114 produces no output, the output from the OR element 110 sets the flip-flop F14 through the INHIBIT element 112. The set output from the flip-flop F14 actuates the pulse generator 119 to produce a series of clock pulses.

In case it is necessary to return change to the customer, the clock pulses from the generator 119 are applied as an input to the INHIBIT elements 117 and 121. As previously mentioned, upon production of every one pulse from the generator 119 one 10-cent and/or one 50-cent coin is delivered out. When it is necessary to return change to a purchaser, as many coins may be delivered out as are required to cause the output of the counters 16 and 20 to be shifted onto their respective "0" output terminals to which the lines L16 and L17 are connected, respectively. (A signal already exists on the line L18 at this time.) To put it in detail, prior to the appearance of the signals on the lines L16 and L17, every time the pulse generator 119 produces one clock pulse, the INHIBIT elements 117 and 121 produces a corresponding output pulse, so that the solenoids 128 and 130 are energized as many times as are required to deliver out as many 10-cent and 50-cent coins as it is necessary to return to the purchaser. The output pulses from the generator 119 also appear on the lines L20 and L21 through the INHIBIT elements 116 and 120, respectively (due to the absence of the inhibit input thereto through the lines L16 and L17), and the pulses on the lines L20 and L21 are applied to the counters 16 and 20, respectively, so that the counters 16 and 20 conduct subtraction of the number of input pulses through the lines L20 and L21 from the number of the pulses previously memorized therein corresponding to the value of the money introduced. When the operation of subtraction results in the appearance of a signal on the "0" output terminals of the counters 16 and 20, all of the lines L16, L17 and L18 have a signal thereon, so that all of the INHIBIT elements 112, 116, 117, 120 and 121 receive an INHIBIT input. At the same time, the output from the AND element 114 resets the flip-flop F14, thereby terminating the operation of the pulse generator 119.

When the money introduced into the machine does not amount to the price of the article selected, the money already introduced must be returned to its owner. This is effected in the following manner: In this case over-subtraction is resulted in the counters 16, 20 and 24, as will be easily understood, so that a signal appears on the line L13 without fail. Under the condition, when the counter 80 applies a "carry" pulse to the AND element 92, this element 92 produces an output to be applied through the OR element 94 to reset the flip-flop F11, so that an inhibit input is applied to the INHIBIT element 84. The output from the AND element 92 is also applied as an inhibit input to the INHIBIT element 88. However, this inhibit input disappears instantly due to the differentiator D6, so that the flip-flop F11 is again set. As a result, the inhibit input that has until then been applied to the INHIBIT element 84 is removed, so that the counter 80 resumes counting the pulses applied thereto from the pulse generator 82. During the counting operation, when an output is produced at the "1" terminal, the output condition of the binary counter 32 is reversed, so that a signal appears on the line 30, causing the counters 16, 20 and 24 to be ready for summation. At this time, since that one of the flip-flops F1 to F10 that were set upon selection of an article has not yet been reset, the counters 16, 20 and 24 count, sum up and register the number of pulses corresponding to the price of the article that has been selected.

Upon completion of the summation, the output condition of the counters 16, 20 and 24 becomes the same as that when the coins were previously introduced into the machine. Under the condition, when the counter 80 produces a "carry" pulse on the line L12, this output pulse sets the flip-flop F13 through the INHIBIT element 98. Till then the flip-flop F12 has been kept set if the money introduced does not amount to the price of the article selected. Therefore, upon setting of the flip-flop F13 the other input to the OR element 100 is removed, so that the OR element 100 receives no input. This causes the NOT element 106 to produce an output to be applied to the line L15 on the one hand and through the OR element 104 to the line L14 on the other hand.

The signal on the line L15 is applied through the OR element 90 to the binary counter 32 to set the same, so that its output is shifted onto the line 34, thereby setting the counters 16, 20 and 24 ready for subtraction. On the other hand, the signal on the line L14 actuates the coin delivery control circuit shown in FIG. 2, so that 10-cent and/or 50-cent coins will be delivered until the counters 16, 20 and 24 produce an output on their respective "0" output terminals. The operation is the same as that of delivering out change.

Suppose that the purchaser who has dropped into the machine some coins wishes to refrain from purchasing and have the money dropped returned. Then he may simply press a cancel push button switch PB shown in FIG. 1. When the push button has been pressed, the output condition of the counter 32 is reversed so as to produce an output on the line 34. This output sets the counters 16, 20 and 24 ready for subtraction. When the push button switch PB is closed, a signal is also applied to a line 30 (FIG. 2), so that as in the case of delivering change, the solenoids 128 and 130 are energized by the clock pulses from the generator 119 as many times as are required to deliver out coins in the amount corresponding to the value of the coins introduced.

Suppose that a 50-cent coin has been dropped to purchase a 20-cent article. Then an output appears on the "0," "1" and "0" output lines of the counters 16, 20 and 24. Then, when the 20-cent article selection push button S2 is pressed, the flip-flop F2 is set to apply its set output to the AND elements 41 and 42. The set output from the flip-flop F2 is also applied through the OR element 86 and differentiator D5 to the flip-flop F11 to set the same, thereby removing the inhibit input to the element 84. This allows the clock pulses from the generator 82 to enter the counter 80 through the INHIBIT element 84 and the differentiator D4. When a first pulse has been counted by the counter 80, an output appears at the "1" output terminal thereof, which sets the binary counter 32 through the OR element 90. The set output on the line 34 conditions the counters 16, 20 and 24 ready for subtraction. When a second and then a third pulse are counted, the output from the counter 80 is shifted onto the "2" and then "3" output terminals. These outputs on the "2" and "3" terminals are applied as one input to the AND elements 41 and 42, respectively, whereupon with the other input to these AND elements being supplied from the set flip-flop F2, first the AND element 41 and then 42 produces an output. These outputs are successively applied through the OR elements 75, 14 and the differentiator D1 to the counter 16, so that the number of these pulses, that is, 2 (corresponding to the price of the article selected, that is, 20 cents) is subtracted from the number of the pulses memorized in the counters 16, 20 and 24 (corresponding to the value of the coin introduced, that is 50 cents). As a result, an output appears on the "3," "0" and "0" output lines of the counters 16, 20 and 24, respectively.

When the counter 80 has completed scanning of the AND elements 41 to 46 and produces a "carry" pulse on the line L12, the INHIBIT element 88 reecives an inhibit input and at the same time the flip-flop F11 is reset, whereupon the INHIBIT element 84 receives an inhibit input, thereby preventing any more clock pulses from being applied to the counter 80. On the other hand, the output from the OR element 96 dissappears, so that the NOT element 102 produces an output, which appears at the terminal P indicating the termination of the counting operation on the one hand and is applied through the OR element 104 to the line L14 on the other. This signal sets the flip-flop F14 through the OR element 104 and INHIBIT element 112 (FIG. 2). The set output from the flip-flop F14 actuates the generator 119 to produce a series of pulses. At this time, since there is no signal on the line L16 but a signal exists on the lines L17 and L18, the INHIBIT element 117 receives no inhibit input, but the INHIBIT element 121 receives an inhibit input. Consequently, every time one clock pulse is applied to the INHIBIT element 117, the solenoid 128 is energized to cause one 10-cent coin to be delivered out onto the purchaser's hand. The clock pulses from the generator 119 are also applied to the input terminals of the INHIBIT elements 116 and 120. Since the INHIBIT element 120 receives an inhibit input from the AND element 118, the clock pulses cannot pass through the element 120. However, since there is no inhibit input to the INHIBIT element 116, it produces output pulses on the line L20, one pulse for every one clock pulse from the generator 119 (that is, for every one 10-cent coin delivered out). Since the line L20 is connected to the OR element 14 (FIG. 1), the pulses on the line L20 are applied to the counter 16 so that the number of pulses (corresponding to the number of 10-cent coins to be returned as change) is subtracted from the number of the pulses (that is, 3) then memorized in the counters 16, 20 and 24, corresponding to the value of the coin introduced (that is, 50 cents) minus the price of the article selected (that is, 20 cents).

When three pulses have appeared on the line L20 to be applied to the counter 16 (that is, three 10-cent coins have been delivered out), the output of the counter 16 is shifted down to the "0" terminal, so that all the counters 16, 20 and 24 now have an output at their respective "0" output terminals connected to the lines L16, L17 and L18, respectively. As a result, the AND element 114 produces an output, which is applied as an inhibit input to the INHIBIT element 112 and as a reset input to the flip-flop F14. The signal on the line L16 is applied as an inhibit input to the INHIBIT elements 116 and 117, and the output from the AND element 118 is applied as an inhibit input to the INHIBIT elements 120 and 121. This condition is detected by any suitable means so as to provide a reset signal to be applied through reset lines R to the counters 32 and 80 and all the flip-flops, thereby restoring the original condition of the system.

Suppose that for an 80-cent article a purchaser has dropped only 60 cents into the machine. Then, an output appears on the "1" output terminals of the counters 16 and 20 and the "0" terminal of the counter 24. Then, when the 80-cent article selection push button S8 is pressed, one input signal is applied to the AND elements 45, 43, 42 and 41. Just as in the above described case, the clock pulses from the generator 82 cause the scanning counter 80 to step forward. When a first pulse is applied to the counter 80, its output is shifted onto the "1" output terminal thereof. This signal is applied through the OR element 90 to the binary counter 32 to reverse its output condition thereby setting the counters 16, 20 and 24 ready for subtraction. As a second and following pulses are applied to the counter 80, its output is successively shifted onto the next output terminals, thereby applying an input to the AND elements 41 to 46 successively. The AND elements 41, 43 and 45 receive the other input caused by the closing of the article selection switch S8, but the AND elements 44 and 46 do not receive any other input. Consequently, the AND element 41, 42, 43 and 45 alone produce an output. The outputs from the AND elements 41, 42 and 43 are applied to the counter 16 as "price" pulses, that is, the pulses which corresspond to the value of the money introduced and which are to be subtracted from the number of the pulses ("money" pulses) memorized in the counter; while the output from the AND element 45 is applied to the counter 20 as a "price" pulse.

As will be easily understood, the application of these "price" pulses expressing the number of eight (corresponding to the 80-cent article selected) results in oversubtraction since the number memorized in the counters is six corresponding to the 60-cent money dropped, so that an output appears at the "3," "1" and "3" terminals of the counters 16, 20 and 24, respectively. To put it in more detail, it is recalled that due to the introduction of money amounting to 60 cents, an output exists at the "1," "1" and "0" terminals of the counters 16, 20 and 24. Under the condition, when the output from the AND element 41 caused by the output at the "1" terminal of the counter 80 is applied to the counter 16, the output of the counter 16 is shifted down onto the "0" output terminal; when the output from the next AND element 42 is applied to the counter 16, the output at the "0" output terminal thereof is shifted round onto the "4" output terminal thereof. At the same time a "carry" output pulse is produced from the counter 16 to be applied to the next counter 20, so that the output at the "1" output terminal of the latter counter is shifted backward onto its "0" output terminal. When the output from the AND element 43 is applied to the counter 16, its output is shifted from the "4" down to "3" output terminal. Finally when the output from the AND element 45 is applied to the counter 20, the output at the "0" output terminal thereof is shifted backwardly onto the "1" output terminal thereof, whereupon a "carry" output pulse is produced by the counter 20 to be applied to the next counter 24, so that the output at the "0" output terminal of the latter counter is shifted round onto the "3" output terminal. Thus, the counters 16, 20 and 24 have an output at the "3," "1" and "3" output terminals thereof, respectively.

When the subtraction has been completed, a signal is produced by the counter 80 on the line L12. With the above-mentioned signal existing on the line L13 at this time, the AND element 92 receives two inputs and produces an output, which is applied as an inhibit input to the INHIBIT element 88 and also as a reset input to the flip-flop F11. The reset input to the flip-flop F11 is maintained only while the output pulse from the differentiator D6 lasts. Therefore, when the output from the differentiator D6 disappears, the output from the AND element 92 also disappears, so that the inhibit input to the element 85 and the reset input to the flip-flop F11 are both removed. On the other hand, the flip-flop F8 is still kept set, so that the output from the differentiator D5 again sets the flip-flop F11, whereupon the counter 80 resumes stepping forward from "0." When the output of the counter 80 is shifted onto the "1" output terminal thereof, the output condition of the binary counter 32 is again reversed to set the counters 16, 20 and 24 ready for summation again. As the counter 80 steps forward, the AND elements 41, 42, 43 and 45 produce an output one after another (due to the flip-flop F8 being kept set), so that three input pulses are successively applied to the counter 16 and then one input impulse, to the counter 20. These "price" pulses are added to the result of the subtraction previously conducted in the counters 16, 20 and 24, so that when the scanning operation of the counter 80 has been completed, an output appears at the "1," "1" and "0" output terminals of the counters 16, 20 and 24, respectively. This output condition of the counters 16, 20 and 24 is quite the same as that when the coins amounting to 60-cents were first dropped into the machine.

Upon completion of the scanning operation of the counter 80, a "carry" output appears on the line L12, whereupon the INHIBIT element 98 produces an output since there is no inhibit input at this time applied thereto through the line L13. The output from the INHIBIT element 98 sets the flip-flop F13, the set output from which resets the flip-flop F11 through the OR element 94. Meanwhile, the flip-flop F12 has been in a set condition, so that there is no reset output from the flip-flop F12 to be applied as one input to the OR element 100. Therefore, upon setting of the flip-flop F13, the other input to the OR element 100 is removed, so that the NOT element 106 produces an output on the line L15 and through the OR element 104 on the line L14. The signals on the lines L15 and L14 energizes the solenoids 128 and 130, respectively, once, so that one 50-cent coin and one 10-cent coin are delivered out, as will be easily seen from the previously mentioned case.

Having illustrated and described one preferred embodiment of the invention, it is understood that there are many changes and modifications thereof without departing from the scope of the invention.

What I claim is:

1. An automatic vending machine control system, comprising means for detecting the money introduced thereinto to provide "money" pulses corresponding to the value of said money; reversible pulse counting means adapted to be set to a first condition capable of summation and alternatively to a second condition capable of subtraction; means for applying said "money" pulses to said reversible pulse counting means being set to said first condition, so that said counter means register the number expressed by said "money" pulses; a plurality of article selection switch means adapted to be selectively operated in accordance with the kind of article the purchaser wishes to purchase; means operable in response to the operation of said switch means to provide "price" pulses corresponding to the price of the article selected; means for applying said "price" pulses to said reversible counting means being set for subtraction, so that the number expressed by said "price" pulses is subtracted from the number expressed by said money pulses and registered in said counting means; money-delivery means; means for applying subtraction pulses to said counting means when said subtraction has resulted in a positive number, so that said subtraction pulses are subtracted from the result of said first-mentioned subtraction; and means operable in response to said subtraction pulses to actuate said money-delivery means to deliver out money the value of which corresponds to the number expressed by said subtraction pulses applied to said counting means until said second subtraction has resulted in zero.

2. The system of claim 1, further including second detecting means for detecting said first subtraction having resulted in over-subtraction; means operable in response to said second detecting means to change said reversible pulse counting means from said second back to said first condition; means for applying said "price" pulses again to said reversible pulse counting means being set to said first condition; and means operable upon completion of application of all said "price" pulses to said counting means to change said counting means from said first to said second condition again, so that said subtraction pulse applying means applies subtraction pulses to said counting means.

3. The system of claim 1, further including a cancel push button switch adapted to be actuated before actuation of said article selection switch means to change said counting means from said first to said second condition, so that said subtraction pulse applying means applies subtraction pulses to said counting means until the subtraction has resulted in zero.

References Cited

UNITED STATES PATENTS

| | | |
|---|---|---|
| 3,221,860 | 12/1965 | Klaffky. |
| 3,323,626 | 6/1967 | Akira Abe et al. _____ 194—10 |
| 3,428,157 | 2/1969 | Patterson et al. _____ 194—2 |

SAMUEL F. COLEMAN, Primary Examiner